Dec. 2, 1941.     R. V. HERMAN     2,264,529
KEYSTONE CHAIN
Filed Nov. 18, 1940
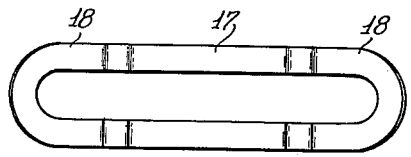
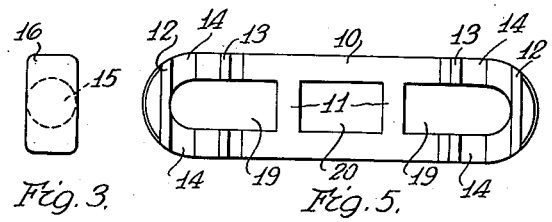
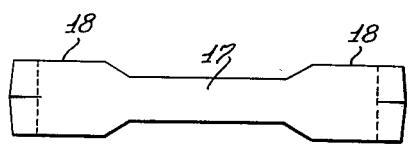
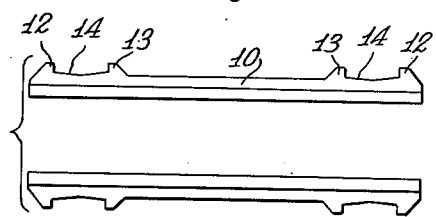
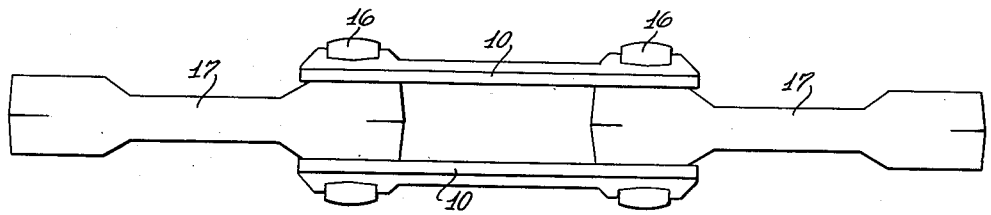
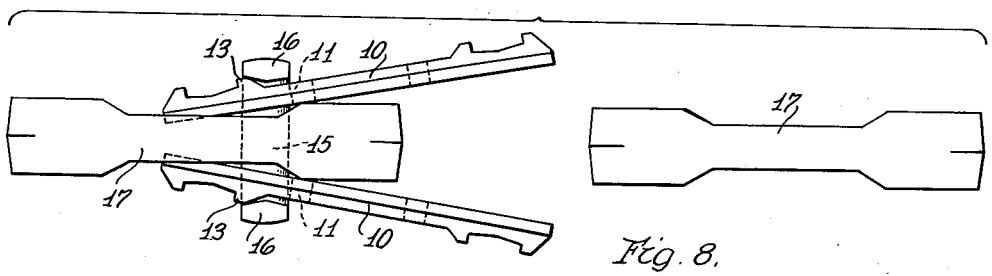
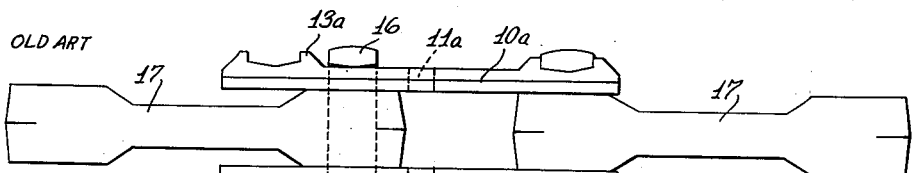
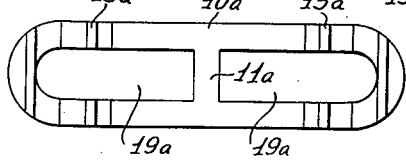
INVENTOR.
Rudolph V. Herman
BY Joseph Farley Patented Dec. 2, 1941

2,264,529

UNITED STATES PATENT OFFICE 2,264,529

KEYSTONE CHAIN

Rudolph V. Herman, Detroit, Mich., assignor to Trolley Conveyors Development Foundation, Inc., Detroit, Mich., a corporation of Michigan Application November 18, 1940, Serial No. 366,130

3 Claims. (Cl. 74—254)

This invention relates to improvements in rivetless chain of the type shown in United States Patent No. 870,704, November 12, 1907, to J. H. Weston, sometimes also called keystone chain.

In this type of chain the links fit together in "Chinese puzzle" fashion and individual links may be readily removed from or added to the chain. It is perhaps the ease with which the chain may be shortened or lengthened which is the most important feature of this chain. However, with the conventional type of keystone chain it is possible to assemble the chain incorrectly. This invention has as its object the provision of an improved type of keystone chain which does not admit of any assembly other than the correct assembly.

The above object and other incidental objects of the invention will be more readily apparent from the following description and the accompanying drawing.

Figs. 1 and 2 are plan and side views of the center link of improved chain.

Figs. 3 and 4 are plan and side views of the locking pin.

Figs. 5 and 6 are plan and side views of the side bars of the improved chain.

Fig. 7 shows the parts of the improved chain in assembled condition.

Fig. 8 shows the result of attempting to assemble the improved chain in an improper manner.

Fig. 9 shows how the conventional chain may be misassembled.

Fig. 5—a is a plan view of a side bar of a conventional keystone chain which may be compared with Fig. 5.

Referring to the drawing, it will be seen that a unit of the chain consists of four parts: Two side bars of the form shown in Figs. 5 and 6, a locking pin shown in Figs. 3 and 4, and a center link shown in Figs. 1 and 2. The improved chain differs from the conventional chain in the side bars. Otherwise, the parts may be similar.

The side bar shown in Figs. 5 and 6 consists of an oblong-shaped link 10 symmetrical about a longitudinal and a transverse axis. Two center members 11 extend from one side of the link to the other in a transverse direction and divide the interior of the side bar 10 in approximately three equal parts consisting of end slots 19 at either end of the link 10 and a center slot 20 in the middle of the link. Each end of the side bar 10 is provided with a boss 12 extending across its top surface. Additional bosses 13 extend upwardly on the side portions of the link at a spaced interval from the bosses 12 with the result that, at each end of the side bar 10, the boss 12 and the two bosses 13 form recesses 14 in which the head of the locking pin, to be later described, may be received.

The corresponding element in the conventional keystone chain is shown in Fig. 5—a from which it will be seen that the structures differ in that the side bar for a conventional keystone chain is provided with but one center member 11—a which is in the middle of the link 10—a and is hence some distance removed from the bosses 13—a. The end slots 19—a are hence quite long.

The center pin for the chain is shown in Figs. 3 and 4 from which it will be seen that it consists of an I-shaped member 15 having a central shank and provided at each end with a rectangular head 16, the width of which is equal to the diameter of the shank so that the head 16 extends beyond the shank of the pin only on two sides. This is the same form of pin as is used in the conventional keystone chain and is well known to the art.

The center link of the chain as shown in Figs. 1 and 2 consists of an oblong-shaped link 17 symmetrical about all its axes and having greatly thickened end portions 18 so that from the side the link is somewhat the shape of a dumbbell. This center link likewise is similar to the center link in the conventional chain.

The relative dimensions of the parts are of considerable importance as they permit the chain to be assembled and at the same time prohibit the chain from falling apart once it has been assembled. These dimensions are as follows:

The inside diameter of the side bar 10 and the inside diameter of the center link 17 is slightly greater than the diameter of pin 15. The length of each end slot 19, that is, the distance from cross member 11 to the inside end of the link 10, is at least, but should not greatly exceed, the length of the head 16 of the locking pin 15. The bosses 13 are disposed with respect to the bosses 12 so that the head 16 of the locking pin 15 may just be accommodated in the recesses 14 therebetween. The length of the shank of pin 15, that is, the distance between the heads 16 at either end, is equal to the thickness of the end 18 of the center link 17 plus the thickness (not including any bosses) of two side bars 10. The amount by which the end portions 18 of the center link 17 exceed the thickness of the waist portion of said link will more than make up for the height of two bosses such as 13.

The improved chain is assembled in the same manner as the conventional chain, that is to say, the locking pin 15 is inserted through the center narrow-waisted portion of the center link 17. Thereafter the end slot 19 of one side bar 10 is inserted over the top of the locking pin 15 and the end slot 19 of another side bar 10 is inserted over the bottom of the locking pin 15 where it projects below the center link 17. Due to the fact that the central portion of the center link 17 is of greatly reduced thickness, there is a great deal of freedom between the locking pin 15 and its engagement with the side bars 10, and these side bars can readily be turned with respect to the locking pin 15 so that the heads 16 of the locking pin 15 can be seated in the recesses 14 between the bosses 12 and 13 at the ends of the side bars. When the locking pin 15 is so engaged in these recesses, the side bars 10 can be separated sufficiently to permit them to be pulled over the enlarged end 18 of center link 17 bringing the parts into the assembled position shown in Fig. 7. The foregoing is the normal way in which chain of this type is assembled and applies equally well to the conventional chain and the improved chain here disclosed.

However, it is possible for the conventional keystone chain to be incorrectly assembled and this results from the fact that the bosses 13—a are so far removed from the center cross member 11—a and the end slots 19—a are so long as to permit the head 16 of the locking pin 15 to seat between bosses 13—a and the center cross member 11—a and thus allow the misassembly shown in Fig. 9 which, of course, is entirely wrong.

In the present invention it is quite impossible for the misassembly above described to occur. It will be noted from Figs. 5 and 6 that each side bar 10 has been provided with two cross members 11 which are disposed inwardly of the bosses 13 by an amount which is less than the diameter of the locking pin 15 and that hence it would be impossible for the head 16 of the locking pin 15 to seat squarely on the side bar 10 unless it seats between the bosses 12 and 13. It cannot seat between the bosses 13 and the cross member 11 because the distance between the two is less than the diameter of the locking pin 15 or the diameter of the head 16. The result of an attempt to misassemble the improved chain in a manner similar to the misassembly of the conventional chain is shown in Fig. 8, and while perhaps the locking pin 15 may be improperly placed with respect to the side bars 10, it is quite evident that if so placed the assembly cannot be completed because it is impossible to draw the top and bottom links 10 over the enlarged ends 18 of the center link 17 to form the completed chain unit.

It will be seen from the foregoing that the improved type of chain has every advantage of the conventional keystone chain, yet cannot, under any circumstances, be improperly assembled. From this it follows that an operator, however inexperienced or ignorant of the art, cannot assemble the improved chain in any other than the correct way. It also follows that those experienced in the use of the conventional keystone chain will find that the improved chain eliminates the nuisance and loss of time in re-assembling links which have been misassembled either through inadvertence or haste.

It occasionally happens in the conventional chain that a link is misassembled and passes undetected. The presence of such a misassembled link is a menace to the machinery and often causes breakage. With the improved type of construction, all possibility of this menace is avoided.

There is a minor advantage which results from the use of two cross members 11 in the side bars 10. As noted before, the end slots 19 are only slightly longer than the length of head 16 of the locking pin 15. As a consequence of this, the pin 15 does not fall out of the side bar quite so easily during assembly of the chain and before the pin is turned to bring the head 16 at right angles to the side bar.

Those skilled in the art will readily conceive of numerous changes, alterations and modifications not departing from the scope and spirit of the invention as described by the appended claims.

I claim:

1. A keystone chain comprised of center links, side bars and I-shaped locking pins, said side bars being flat on the chain side and having pairs of bosses on the other side thereof, each pair spaced from an end of said side bar by an amount sufficient to accommodate the head of a locking pin between said pair and said end, and a cross member for each pair of bosses, each such cross member extending from one side of said side bar to the other and located centrally from said pair of bosses by an amount less than the diameter of said locking pin.

2. In a keystone chain a side bar flat on one side and having on the other side areas at either end adapted to engage an end of a locking pin and having near each such area a cross member extending between the sides of said side bar and spaced from such area by an amount less than the diameter of a locking pin.

3. A keystone chain each unit of which comprises a center link, two side bars, and two locking pins, the ends of each locking pin engaging the ends of the two side bars and the center of each locking pin engaging the end of a center link, each of said side bars being flat on the chain side thereof and having on the other side thereof at either end areas designed to receive the heads of a locking pin in seated engagement, each of said side bars being further provided with a plurality of cross members extending across the inner portion of said side bars and so located with respect to the area of said side bar which is designed to receive the locking pin in seated engagement that the locking pin cannot be accommodated and seated between such area and such cross member.

RUDOLPH V. HERMAN.